United States Patent [19]

Wan

[11] 4,112,321

[45] Sep. 5, 1978

[54] BRUSH HOLDER AND BRUSH ASSEMBLY FOR A DYNAMOELECTRIC MACHINE

[75] Inventor: John P. Wan, Cambridge, Canada

[73] Assignee: Electrohome Limited, Kitchener, Canada

[21] Appl. No.: 819,413

[22] Filed: Jul. 26, 1977

[51] Int. Cl.[2] .................................... H02K 13/00

[52] U.S. Cl. .................................... 310/242; 310/43; 310/245

[58] Field of Search ............... 310/239, 240, 241, 242, 310/245, 246, 247, 248, 249, 43

[56] References Cited

U.S. PATENT DOCUMENTS

| | | | |
|---|---|---|---|
| 2,358,958 | 9/1944 | Brown | 310/249 |
| 2,763,800 | 9/1956 | Curley | 310/239 |
| 3,182,218 | 5/1965 | Videtic | 310/239 |
| 3,967,148 | 6/1976 | Walsh | 310/239 |
| 4,041,339 | 8/1977 | Huber | 310/239 |

*Primary Examiner*—R. Skudy

*Attorney, Agent, or Firm*—Sim & McBurney

[57] ABSTRACT

A brush holder and brush assembly for a dynamoelectric machine is constructed in such a way that the holder can be moulded in one piece of electrical insulating material. The holder has an opening which receives the rotating part of the machine to be contacted by current carrying brushes. The holder includes at least two oppositely disposed brush holding housings each having an end wall remote from the aforesaid opening and being open on two opposite sides thereof. Each housing also has two spaced apart side walls facing each other and extending from the end wall, the end of the housing opposite the end wall being open and opening into the aforementioned opening which receives the rotating part of the machine. Ribs extend inwardly from the side walls of the housings and run between the two ends of the housings. These ribs extend into recesses in the side walls of current carrying brushes that are mounted in the housings with the brushes engaging the side walls of the housings. Springs are located in the housings between the brushes and the end walls biasing the brushes towards the opening in the holder that receives the rotating part of the machine. Associated with each housing is a finger located adjacent one of the open sides of the housing. The finger and the ribs of each housing contact the spring in the housing and serve to prevent it from falling through the open sides of the housing.

9 Claims, 5 Drawing Figures

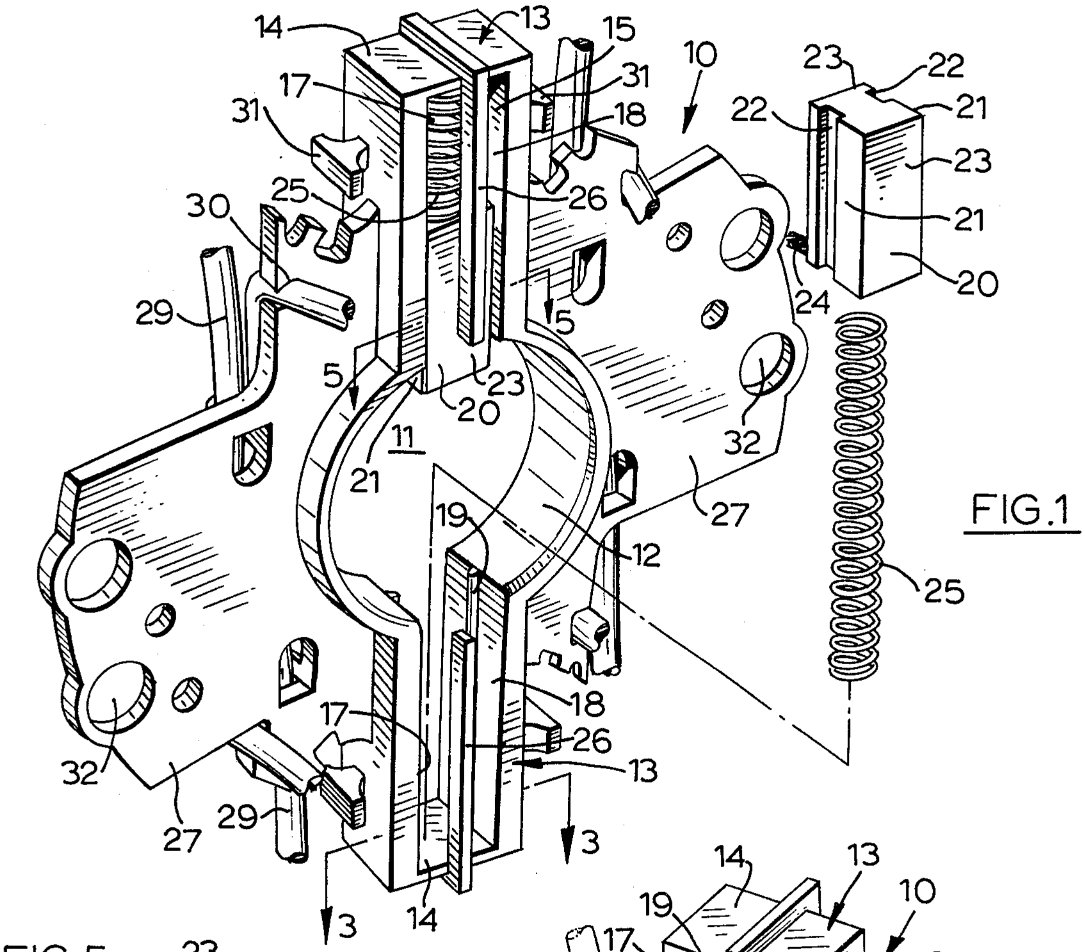
FIG. 1
FIG. 5
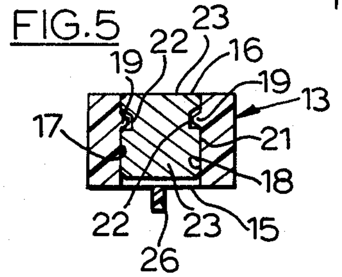
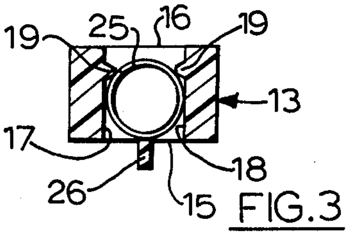
FIG. 3
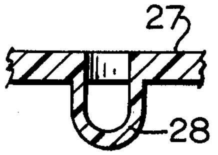
FIG. 4
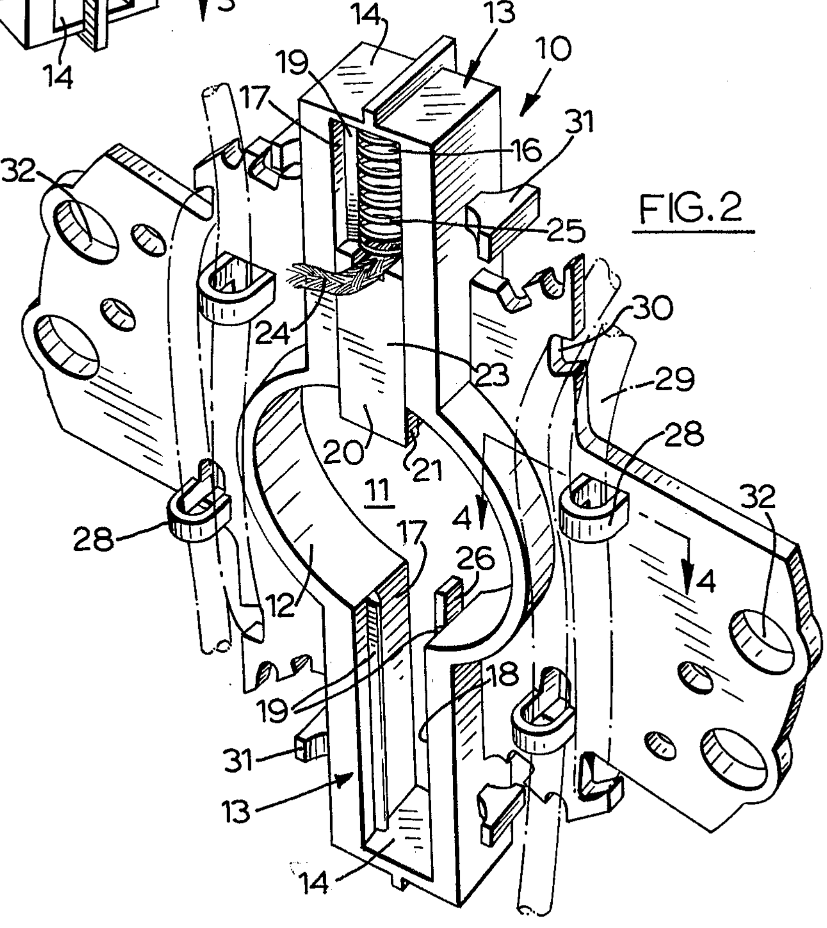
FIG. 2

BRUSH HOLDER AND BRUSH ASSEMBLY FOR A DYNAMOELECTRIC MACHINE

BACKGROUND OF THE INVENTION

This invention relates to a brush holder and brush assembly for use with a dynamoelectric machine. More particularly, this invention relates to a brush holder and brush assembly designed so that the former can be molded in one piece of plastics or other suitable electrical insulating material, the nature of the construction being such that brushes carried by the holder are positively and firmly supported and guided with ample provision being made to dissipate heat from the brushes.

There is shown in U.S. Pat. No. 3,182,218, issued May 4, 1965, S. Videtic, a brush holder plate that can be moulded in one piece. The primary problem with the Videtic plate is that the brushes are very substantially confined by the brush holding housings. In other words, two whole faces of each rectangular brush contact side walls of the brush holder housing while somewhat less than one half of each of the other faces of each brush contact side walls of the brush holder housing. This housing is constructed of a material which is a poor conductor of heat. As a consequence, the Videtic brush holder plate does not promote heat dissipation from the brushes leading to increased brush wear and reduced life. It also should be noted that poor heat dissipation may cause the Videtic brush to expand and bind in its holder and also might result in melting of the brush holder itself.

It has been found, according to one aspect of this invention, that the aforementioned problem of the Videtic brush holder plate can be overcome by eliminating the partial side walls of the Videtic brush holder housing and retaining and guiding the brushes by means of ribs which extend into recesses in the brushes. This exposes two faces of each brush to the atmosphere, substantially improving heat dissipation.

The idea of providing recesses in brushes is disclosed in U.S. Pat. No. 2,763,800, issued Sept. 18, 1956, B. A. Curley, but the Curley brush holder plate suffers from the disadvantage that the sides of the brushes containing the recesses are not supported, except for edges of the plate itself that fit into the recesses. As a consequence, the Curley brushes can be rotated to some extent about their longitudinal axes, this problem becoming more acute as the brushes wear down and the recesses become larger due to sliding of the brushes in their holders, resulting in increased brush wear and greater noise. It also should be noted that the type of spring employed by Curley is more expensive than a coil spring which can be used in the practice of the instant invention. The Curley brush holder plate is such that it could not be used with a coil spring, since no means are provided for retaining a coil spring.

The aforementioned problem is solved in a brush holder embodying this invention by providing full support for the brushes at the sides thereof containing the recesses.

BRIEF DESCRIPTION OF THE INVENTION

In accordance with one aspect of this invention there is provided a brush holder and brush assembly for a dynamoelectric machine, said holder comprising a moulded, one-piece member of electrical insulating material having an opening therein adapted to receive a rotating part of the machine that is adapted to be contacted by electrical current carrying brushes, said member including at least two oppositely disposed brush holding housings, each of said housings having an end wall remote from the aforesaid opening and being open on two opposite sides thereof, each of said housings also having two spaced apart side walls facing each other and extending from said end wall thereof, each of said housings also having a second end opposite said end wall, said second end being open and opening into the aforesaid opening adapted to receive said rotating part of said machine, each of said side walls of each of said housings having inwardly projecting ribs extending from adjacent one end wall of the said housing to adjacent the other end of the housing, an electrical current carrying brush mounted in each of said housings, each said brush having side walls with recesses therein into which said ribs extend, thereby providing tracks for guiding said brushes as they move longitudinally in said housings, said brushes bearing against said side walls of said housings, spring means located within said housings between said end walls thereof and said brushes and biasing said brushes into the opening in said member that is adapted to receive said rotating part of said machine, each of said housings also including a finger located adjacent one of said open sides of said housing and formed integral with said member, said finger and said ribs of each said housing contacting said spring in said housing and serving to prevent said spring from falling out of said housing through said open sides thereof.

BRIEF DESCRIPTION OF THE DRAWINGS

This invention will become more apparent from the following detailed description, taken in conjunction with the appended drawings, in which:

FIG. 1 is a perspective view, partly exploded, showing a brush holder and brush assembly embodying this invention;

FIG. 2 is a perspective view of the other side of the brush holder and brush assembly shown in FIG. 1; and FIGS. 3 to 5 inclusive are sections taken along lines 3—3, 4—4 and 5—5.

DETAILED DESCRIPTION OF THE INVENTION INCLUDING THE PREFERRED EMBODIMENT

Referring to FIGS. 1 and 2, a brush holder and brush assembly embodying the instant invention includes a moulded, one-piece member 10 that is moulded of synthetic plastics material or any other suitably electrical insulating material. Member 10 has a circular opening 11 therein defined by circular side walls 12. Opening 11 is sized to permit entry therein of the commutator or other rotating part of a dynamoelectric machine that is adapted to be contacted by electrical current carrying brushes.

Member 10 includes two diametrically oppositely disposed brush holding housings 13. Of course, more than two such brush holding housings 13 may be provided if required by the particular dynamoelectric machine for which the brush holder and brush assembly is designed. Each housing 13 has an end wall 14 that is remote from opening 11 and is completely open on two opposite sides 15 and 16 thereof. Each housing 13 also has two spaced apart side walls 17 and 18 that face each other and which extend from end wall 14. Preferably side walls 17 and 18 are parallel to each other, as shown, and extend at right angles to their associated end wall 14.

The end of each housing 13 opposite its end wall 14 is open and opens into opening 11.

Each of the side walls 17 and 18 has inwardly projecting ribs 19. Ribs 19 extend from adjacent one end wall 14 of each housing 13 to adjacent the other end of the housing 13. Ribs 19 preferably, but not necessarily, are located opposite each other and extend at right angles to the associated end walls 14 of their housings 13.

In each housing 13 there is located an electrical current carrying brush 20, each brush 20 being rectangular in cross section and having two oppositely disposed parallel side walls 21 provided with recesses 22 shaped and configured to receive ribs 19. As best shown in FIG. 5, ribs 19 extend into recesses 22 and thus provide tracks for guiding brushes 20 as they move longitudinally in housings 13. As best shown in FIG. 5, side walls 21 of brushes 20 bear against side walls 17 and 18 of housings 13 so as to provide full support for brushes 20 and inhibit any tendency of the brushes to rotate about their longitudinal axes. On the other hand, each brush 20 has two oppositely disposed parallel side walls 23 that are fully exposed to the atmosphere through the open sides 15 and 16 of each housing 13 to provide for heat dissipation from the brushes.

As shown in FIGS. 1 and 2, and as is conventional, each brush is provided with a lead-in wire or pigtail 24 to permit current to be carried to or away from the brush.

Located within each housing between the end walls 14 thereof and brushes 20 are coil springs 25 that bias brushes 20 into opening 11.

Each housing 13 also includes a finger 26 located adjacent open side 15 of each housing and formed integral with member 10. As best shown in FIG. 3, each finger 26 and the associated ribs 19 of its housing 13 contact the spring 25 within the housing serving to prevent spring 25 from falling out of the housing through either side thereof.

As best shown in FIG. 5, and according to a preferred embodiment of the invention, each finger 26, which essentially is of cantilever construction and extends perpendicular to its associated end wall 14, is spaced from the adjacent side wall 23 of its associated brush 20. As a consequence of this, vibrations will not be directly imparted to fingers 26, thereby minimizing noise while, at the same time, more surface area of each brush 20 is exposed to the atmosphere for heat dissipation purposes.

Member 10 also includes oppositely disposed and directed wings or plates 27 extending from side walls 12 defining opening 11 and side walls 17 and 18 of each housing 13. Wings 27 lie in the same plane and are provided with various openings 32 to permit the brush holder and brush assembly to be secured to the stator of the dynamoelectric machine or some other part thereof. Wings 27 also are provided with molded, generally U-shaped conductor retaining devices 28 through which insulated electrical conductors 29 may be passed. Wings 27 also are provided with strain relief arrangements 30 for conductors 29. It should be understood that wings 27 may assume other completely different forms than that illustrated without departing from this invention in its broadest aspect, and that conductor retaining devices 28 and strain relief devices 30 may or may not be provided.

Optionally provided on each housing 13 are lugs 31 around which pigtails 24 or the conductors (not shown) affixed thereto may be wrapped.

It will be readily apparent to those skilled in the art from an examination of the brush holder and brush assembly shown in the drawings that it can be moulded in one piece because the nature of the construction is such that no component overlies another component, so the two parts of the moulding die can be separated from each other.

Those skilled in the art will appreciate that changes and modifications may be made in the brush holder and brush assembly disclosed herein without departing from the spirit and scope of this invention as defined in the appended claims.

What is claimed is:

1. A brush holder and brush assembly for a dynamoelectric machine, said holder comprising a moulded, one-piece member of electrical insulating material having an opening therein adapted to receive a rotating part of the machine that is adapted to be contacted by electrical current carrying brushes, said member including at least two oppositely disposed brush holding housings, each of said housings having an end wall remote from the aforesaid opening and being open on two opposite sides thereof, each of said housings also having two spaced apart side walls facing each other and extending from said end wall thereof, each of said housings also having a second end opposite said end wall, said second end being open and opening into the aforesaid opening adapted to receive said rotating part of said machine, each of said side walls of each of said housings having inwardly projecting ribs extending from adjacent one end wall of the said housing to adjacent the other end of the housing, an electrical current carrying brush mounted in each of said housings, each said brush having side walls with recesses therein into which said ribs extend, thereby providing tracks for guiding said brushes as they move longitudinally in said housings, said brushes bearing against said side walls of said housings, spring means located within said housings between said end walls thereof and said brushes and biasing said brushes into the opening in said member that is adapted to receive said rotating part of said machine, each of said housings also including a finger located adjacent one of said open sides of said housing and formed integral with said member, said finger and said ribs of each said housing contacting said spring in said housing and serving to prevent said spring from falling out of said housing through said open sides thereof.

2. A brush holder and brush assembly according to claim 1 wherein in each of said housings said side walls are parallel to each other and perpendicular to said end wall of the housing.

3. A brush holder and brush assembly according to claim 2 wherein in each of said housings said ribs are perpendicular to said end wall of the housing.

4. A brush holder and brush assembly according to claim 1 wherein said fingers are spaced from said brushes.

5. A brush holder and brush assembly according to claim 1 wherein in each of said housings said finger is perpendicular to said end wall of the housing.

6. A brush holder and brush assembly according to claim 1 wherein in each of said housings said finger is spaced from its associated brush and is perpendicular to said end wall of the housing.

7. A brush holder and brush assembly according to claim 1 wherein each of said brushes is generally rectangular in cross-section having a first pair of oppositely disposed parallel side walls and a second pair of oppositely disposed parallel side walls, said recesses being located in said first pair of side walls of said brush and said first pair of side walls of said brush bearing against said side walls of said housing containing said brush, said second pair of side walls of said brush being exposed to the atmosphere through said open sides of said housing containing said brush.

8. A brush holder and brush assembly according to claim 1 wherein each of said brushes is generally rectangular in cross-section having a first pair of oppositely disposed parallel side walls and a second pair of oppositely disposed parallel side walls, said recesses being located in said first pair of side walls of said brush and said first pair of side walls of said brush bearing against said side walls of said housing containing said brush, said second pair of side walls of said brush being completely exposed to the atmosphere through said open sides of said housing containing said brush, said fingers being spaced from said brushes.

9. A brush holder and brush assembly according to claim 3 wherein each of said brushes is generally rectangular in cross-section having a first pair of oppositely disposed parallel side walls and a second pair of oppositely disposed parallel side walls, said recesses being located in said first pair of side walls of said brush and said first pair of side walls of said brush bearing against said side walls of said housing containing said brush, said second pair of side walls of said brush being completely exposed to the atmosphere through said open sides of said housing containing said brush, said fingers being spaced from said brushes and perpendicular to said end walls.

* * * * *